United States Patent
Uemura et al.

(10) Patent No.: US 6,612,922 B2
(45) Date of Patent: Sep. 2, 2003

(54) VENTILATION CONTROLLING APPARATUS

(75) Inventors: Yukio Uemura, Nagoya (JP); Masaharu Yamazaki, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/184,375

(22) Filed: Jun. 25, 2002

(65) Prior Publication Data

US 2003/0013404 A1 Jan. 16, 2003

(30) Foreign Application Priority Data

Jul. 12, 2001 (JP) ........................................ 2001-212428

(51) Int. Cl.⁷ ................................................ B60H 1/26
(52) U.S. Cl. ...................................... 454/121; 454/156
(58) Field of Search ............................... 454/121, 156, 454/159, 160, 161; 251/901

(56) References Cited

U.S. PATENT DOCUMENTS

| | | | | |
|---|---|---|---|---|
| 5,899,262 A | * | 5/1999 | Yamaguchi et al. | 165/42 |
| 6,508,703 B1 | * | 1/2003 | Uemura et al. | 454/156 |
| 2002/0146976 A1 | * | 10/2002 | Nishikawa et al. | 454/152 |
| 2002/0197951 A1 | * | 12/2002 | Uemura et al. | 454/121 |

FOREIGN PATENT DOCUMENTS

| | | | |
|---|---|---|---|
| JP | A8-002238 | | 1/1996 |
| JP | 11198632 | * | 7/1999 |

* cited by examiner

*Primary Examiner*—Harold Joyce
(74) *Attorney, Agent, or Firm*—Harness, Dickey & Pierce, PLC

(57) ABSTRACT

A ventilation controlling apparatus uses a flexible film member as a slide door and an air casing design profile, to prevent generation of popping or cracking noises from emanating from the slide door due to air pressure changes against the slide door within the casing. Internal lattices may control the position of the flexible slide door. An aperture for ventilation is opened and closed by moving the slide door inside a casing. Sealing surfaces on the inner side of circumferential edge-sealing portions located at the rear and front sides of the aperture in the moving direction of the slide door are made to have a shape protruding or angled more to the downwind side of the aperture at a central portion than at end portions, with respect to a direction orthogonal to the moving direction of the slide door.

7 Claims, 5 Drawing Sheets

A-A

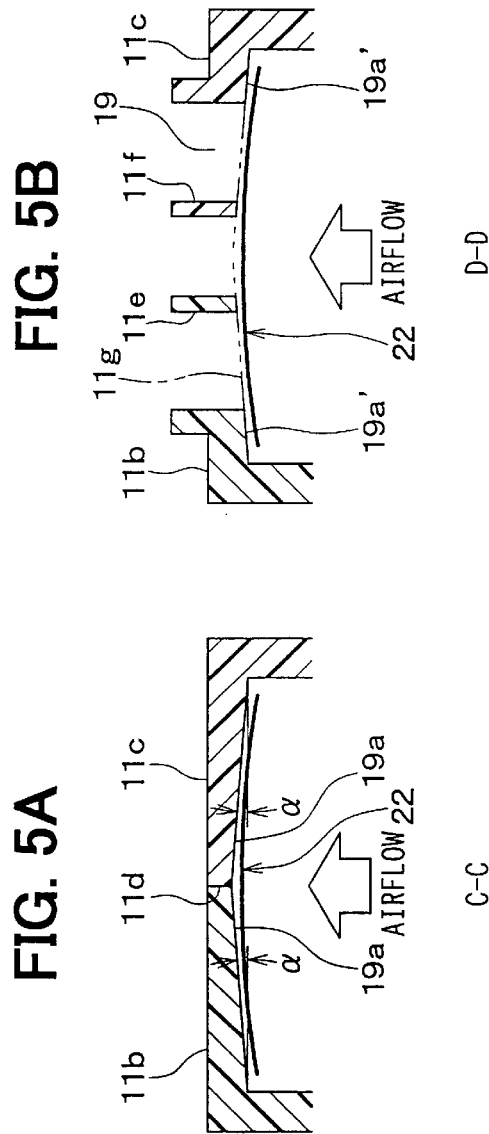
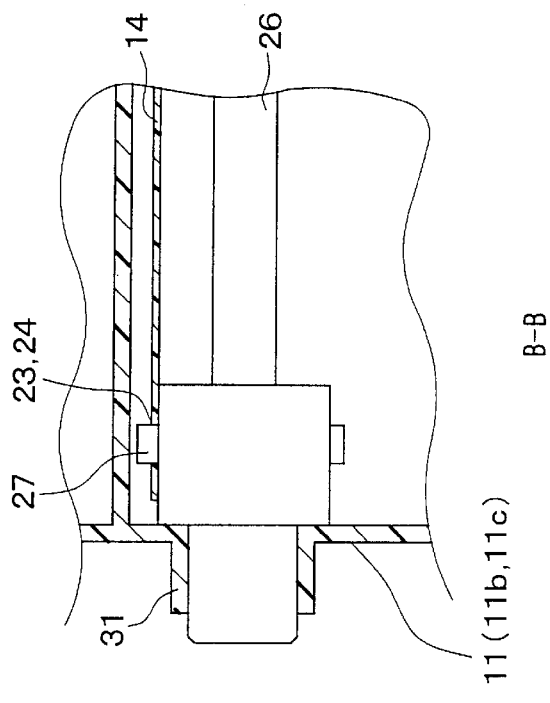

VENTILATION CONTROLLING APPARATUS

CROSS REFERENCE TO RELATED APPLICATION

This application is based upon, and claims the benefit of priority of, prior Japanese Patent Application 2001-212428, filed Jul. 12, 2001, the contents of which are incorporated herein by reference.

BACKGROUND OF THE INVENTION

1. Field of the Invention

The present invention relates to a ventilation controlling apparatus suited for use in a vehicular air-conditioning system. The apparatus opens and closes an air passage slide door that moves inside a passage casing member that forms the air passage.

2. Description of the Related Art

Generally, ventilation controlling apparatuses switch the direction of air passage by moving a film member, such as in Japanese Patent Laid-Open Publication No. Hei. 8-2238. In some instances, such an apparatus is constructed so that one end of the film member is linked to a driving shaft and the other end to a driven shaft so that the film member can be wound. Normally it is necessary to make the driving shaft and the driven shaft move as a linkage. Therefore, it is provided with linking mechanisms such as pulleys and wires. As a result, there is a problem in that the number of components for the entire apparatus increases, and the mounting becomes complicated. Additionally, these occurrences add to the overall cost of such an apparatus.

Consequently, the present applicant has proposed a ventilation controlling apparatus with a simplified construction in which no winding mechanism of the film member is necessary. Such a structure can be found in Japanese Patent Application No. 2000-275306. In this prior application, a guide member is provided inside the casing that forms the air passage, and this guide member guides both of the end portions in a width direction of the film member (corresponding to the slide door of the present invention), and a driving gear of the driving shaft is engaged with the film member. With this construction, the film member reciprocates along the guide member by the rotation of the driving shaft, permitting the air passage of the casing to be opened and closed.

When actually making a prototype and conducting an evaluation test of the apparatus in the above-mentioned prior application, it was understood that the following problem occurred. When a flexible film member slides along the inner wall face of the casing and is guided by the guide member to a point located over an aperture such as a face aperture on the casing side, the film member deforms so as to expand to the downwind side upon receiving airflow pressure. Therefore, when this expanding shape of the film member is to be deformed to a shape in accordance with the shape of circumferential edge-sealing portions at the back and front of the aperture on the casing side by the circumferential edge-sealing portions, the film member makes a sudden change in its shape (flipping over its shape), and generates an abnormal sound (slapping noise).

When the film member advances into the aperture on the casing side, the film member also makes a sudden change in its shape. The film member flips over its shape from a state having a shape conforming to the shape of the circumferential edge-sealing portion of the aperture, and generates an abnormal sound (slapping noise).

SUMMARY OF THE INVENTION

The present invention was made in view of the above-mentioned problems. Therefore, it is an object of the present invention to prevent such abnormal sounds from occurring around the slide door, which is constructed of a flexible film member.

In order to achieve the above-mentioned object, a first aspect of the present invention provides an aperture that is opened and closed by moving a slide door inside a passage casing member. The slide door is formed of a flexible film member. The slide door interfaces with a sealing surface on an inner side of a circumferential edge-sealing portion(19a) located at back and front sides of the aperture in a moving direction ("a", "b") of the slide door (14, 22). The circumferential edge-sealing portions formed on circumferential edges of the aperture, is made to have a shape dented or curved more to a downwind side of the aperture at a central portion than at both end portions of the slide door in the passage member in a direction orthogonal to the moving direction ("a", "b").

With this construction, the film member can maintain an expanded shape to the downwind side of the aperture, when the film member of the slide door moves from the aperture to the circumferential edge-sealing portion at the rear side of the aperture, or when the film member of the slide door moves from the circumferential edge-sealing portion at the front side of the aperture to the aperture. This is because, even when the film member of the slide door receives wind pressure at the aperture, and protrudes in an expanded state to the downwind side, the sealing surface on the inner side of the circumferential edge-sealing portions at the rear and front side in the moving direction of the door has a shape dented to the downwind side of the aperture. As a result, there is no reversal in the shape of the film member of the slide door, and a generation of an abnormal sound (slapping noise) accompanying this reversal in shape of the film member is prevented.

A second aspect of the present invention is characterized in that the passage member is constructed by joining together a plurality of divided passage members in unity, in the first aspect of the present invention. It is also characterized in that a joining surface of the plurality of divided passage members is formed approximately parallel to the moving direction ("a", "b") of the door near the central portion of the door in the direction orthogonal to the moving direction ("a", "b") of the door. That is, the surface is orthogonal to the moving direction of the door.

When the passage member is constructed by the plurality of divided passage members in such a way, and the joining surface of the plurality of divided passage members is formed near the central portion in the direction orthogonal to the moving direction ("a", "b") of the door, the sealing surface on the inner side of the circumferential edge-sealing portion can be formed to have a shape dented to the downwind side. This shape also serves as a draft angle in releasing the member from a mold when molding the divided passage members.

There may be a case in which a deviation in location of the joining surface occurs due to discrepancies or dispersion in sizes during manufacturing. However, an obstruction of the movement of the film member of the slide door can be eased, even when the above-mentioned deviation in location occurs, because the joining surface is roughly parallel to the moving direction ("a", "b") of the door.

A third aspect of the present invention is characterized in that a lattice member, for regulating the slide door from protruding in an expanded state to the downwind side of the aperture due to wind pressure, is arranged roughly parallel to the moving direction ("a", "b"), in the first or second aspect of the present invention. It is also characterized in that both end portions, in the moving direction ("a", "b") of the door, of an end surface of the lattice member on an upwind side is connected on roughly a same surface with the sealing surface on the inner side of the circumferential edge-sealing portion.

With this construction, it is possible to regulate the slide door from protruding to the downwind side due to the wind pressure with the lattice member. Furthermore, it is possible to make the contact surface between the slide door and the end surface on the upwind side of the lattice members shift smoothly to the sealing surface on the inner side of the circumferential edge-sealing portion. This is because the lattice members are roughly parallel to the moving directions ("a", "b") of the door, and both end portions, in the moving direction ("a", "b") of the door, of the end surface at the upwind side of the lattice members are connected in roughly the same surface with the inner side of the circumferential edge-sealing portion. Therefore, it is possible to ensure an even more stable action of the slide door which is composed of a film member.

A fourth aspect of the present invention is characterized in that an aperture is opened and closed by moving a slide door inside a passage member. The slide door is formed of a flexible film member. It is also characterized in that at least one lattice member, for regulating the slide door from protruding in an expanded state to a downwind side of the aperture due to wind pressure, is arranged roughly parallel to a moving direction ("a", "b") of the slide door. Additionally, a sealing surface on an inner side of a circumferential edge-sealing portion located at rear and front sides of the aperture in the moving direction ("a", "b") of the slide door, out of circumferential edge-sealing portions formed on circumferential edges of the aperture, is made to be the following shape in the passage member. This shape has a portion of the sealing surface along an extended direction of a central portion between both end surfaces and the lattice member being dented more to a downwind side of the aperture than portions of the sealing surface along extended directions of both of the end surfaces, and along an extended direction of the lattice member. Both end surfaces mentioned above are in a direction orthogonal to the moving direction ("a", "b") of the aperture.

With this constitution, it is possible to regulate the slide door, which is composed of a film member, from protruding in an expanded state to the downwind side due to the wind pressure with the lattice member.

Incidentally, a phenomenon occurs, in which the slide door protrudes in an expanded state to the downwind side due to the wind pressure between at least one lattice member, and both of the end surfaces of the aperture in the direction orthogonal to the moving direction ("a", "b") of the door. In the fourth aspect of the present invention, in view of this phenomenon, the sealing surface on the inner side of the circumferential edge-sealing portion is made to be a particular shape, with the portion along the extended direction of the central portion between both end surfaces and the lattice member being dented more to the downwind side of the aperture than the portions along the extended directions of both of the end surfaces of the aperture, and along the extended directions of the lattice members.

Therefore, it is possible to maintain the expanding protruding shape of the slide door after it has been regulated by at least one lattice member, even at the circumference edge-sealing portions on the rear and front sides in the moving direction of the door. With this construction, it is possible to exert an effect of restraining the abnormal sound (slapping noise), similar to those in the first aspect, even when the lattice members are arranged inside the aperture.

A fifth aspect of the present invention is characterized in that the apparatus is provided with a plurality of the lattice members as in the fourth aspect of the invention. It is also characterized in that the sealing surface on the inner side of the circumferential edge-sealing portion is made to be a particular shape, with a portion of the sealing surface along an extended direction of a central portion between the plurality of lattice members being dented more to the downwind side of the aperture than portions of the sealing surface along extended directions of the plurality of lattice members. With this constitution, action and effect similar to those mentioned in the fourth aspect can be exerted, even when installing a plurality of lattice members.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 4 is a cross-sectional view taken along line B—B in FIG. 1;

FIG. 5A is a cross-sectional view taken along line C—C in FIG. 1;

FIG. 5B is a cross-sectional view taken along line D—D in FIG. 1;

DETAILED DESCRIPTION OF THE PREFERRED EMBODIMENTS

The following description of the preferred embodiment(s) is merely exemplary in nature and is in no way intended to limit the invention, its application, or uses.

(First embodiment)

Figure 1:
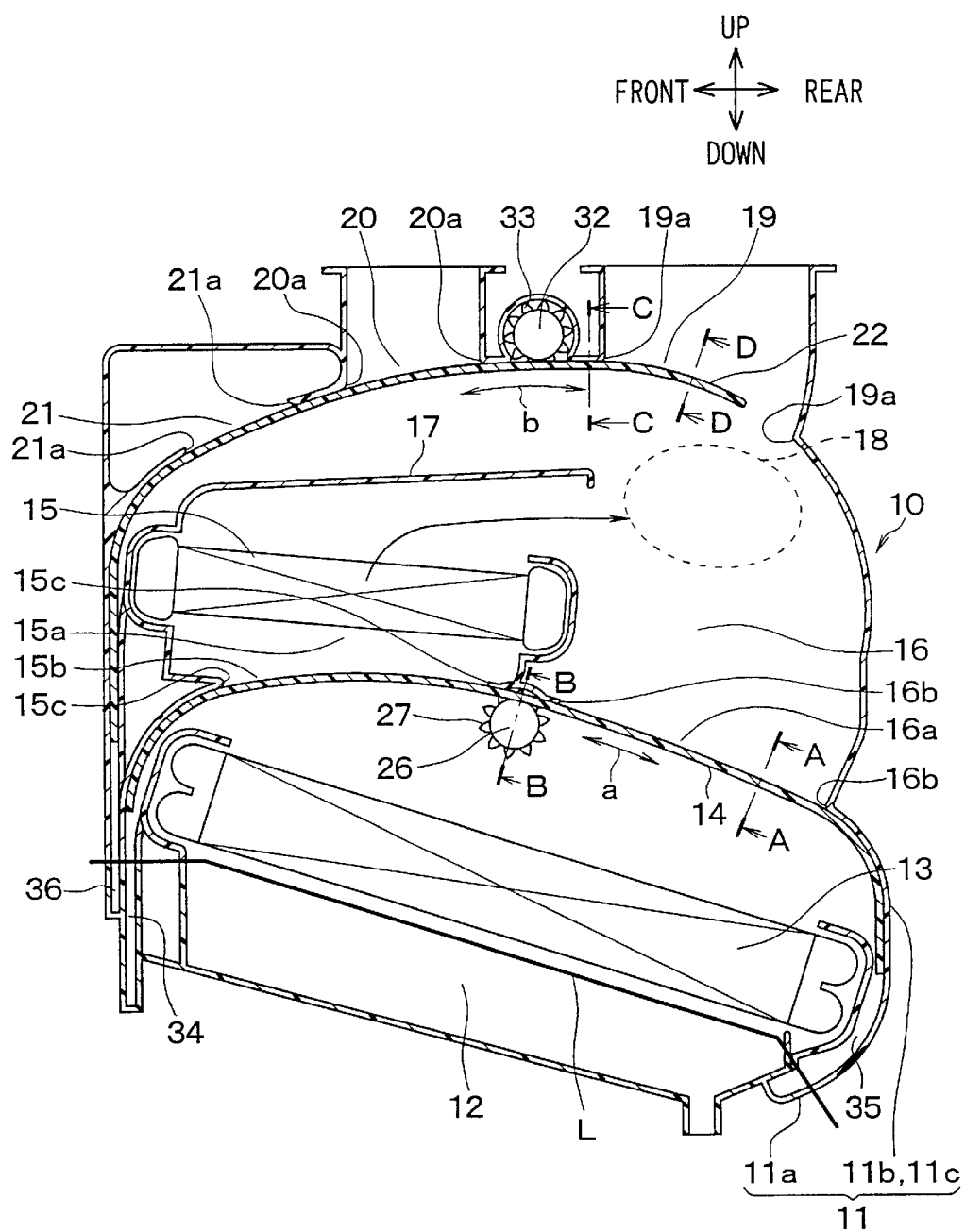
FIG. 1 is a cross-sectional view of an air-conditioning unit portion showing a first embodiment of the present invention.

FIG. 1 shows an air-conditioning unit 10 of an interior unit for a vehicle adopting a first embodiment of the present invention. The air-conditioning unit 10 accommodates a heat exchange unit. This air-conditioning unit 10 is arranged roughly in a central position in the left-to-right (width) direction of the vehicle, behind an instrument panel (not shown) at the front portion of a passenger compartment. Up-and-down and back-and-forth (front to rear) arrows in FIG. 1 indicate directions of the vehicle when the air-conditioning system is installed. The indoor unit of the automotive air-conditioning system is roughly divided into the above-mentioned air-conditioning unit 10 disposed in the central position and an unillustrated blower unit placed behind the instrument panel on the side of the vehicle next to the driver's position.

The blower unit is provided with an inside air/outside air switch box that switches and guides outside air (the air outside the passenger compartment) or inside air (the air inside the passenger compartment), and a blower that blows the air guided into the air switch box. The air blown by this blower unit is made to flow into an air influx space 12 at the bottom of a casing 11 of the air-conditioning unit 10.

The casing 11 is made of an elastic and mechanically strong resin such as polypropylene. To be more specific, the casing 11 is divided by a split mold line L into a lower casing 11a, and upper casings 11b and 11c. Moreover, the upper casing is divided roughly symmetrically with respect to the front and rear portions of the vehicle (the direction perpendicular to the surface of the paper in FIG. 1), into a left upper casing 11b and a right upper casing 11c. The reason the lower casing 11a is divided into a separate body from the upper casings 11b and 11c is to prevent condensed water from generating at an evaporator 13, which will be described later, from leaking out of the casing at the split mold surface (joining surface).

There is an evaporator 13, which is comprised of the heat exchanger for cooling, horizontally arranged above the air influx space 12 inside the casing 11 of the air-conditioning unit 10 with a small inclination angle. Therefore, the air from the blower unit flows into the air influx space 12 and then flows through from the underside to the upper side of the evaporator. As is well known, low-pressure refrigerant, which has been decompressed by a decompressor such as an expansion valve of a refrigeration cycle of the automotive air-conditioning system, is made to flow into the evaporator 13, and this low-pressure refrigerant absorbs heat out of the flowing air, and thereby evaporates.

There is an air-mixing slide door 14, made of a flexible film member, arranged above (downstream side of the airflow) the evaporator 13, and there is also a hot-water heater core 15 arranged above (downstream side of the airflow) the air-mixing slide door 14. As is well known, this heater core 15 is a heat exchanger for heating air. The heater core 15 heats air using hot water from the vehicle engine (that is, the engine's coolant) as the heating source. This heater core 15 is also arranged approximately in a horizontal direction, but the heater core 15 is designed so that it is smaller than a cross-sectional area of a passage inside the casing 11. The heater core 15 is also arranged lopsidedly toward the front of the vehicle in the casing 11, that is, it is offset to the front side of the casing 11. By this arrangement, a bypass passage 16 is formed at a rear portion of the casing. This permits air to bypass the heater core 15.

The air-mixing slide door 14 is for adjusting the proportions of warm air volumes that pass through an air passage 15a (a warm air passage) of the heater core 15, and the cool air that passes through the bypass passage 16. This is done by moving (reciprocating) the air-mixing slide door 14 in a front-to-rear fashion with respect to the vehicle in a space between the evaporator 13 and the heater core 15. The temperature of the air blowing into the passenger compartment can be adjusted by adjusting the volume proportions of the warm air and the cool air. Therefore, this air-mixing slide door 14 is a means for adjusting the temperature of air blowing into the passenger compartment.

The warm air that has passed through the heater core 15 is guided by a warm air guide wall 17 to the rear of the casing 11, and moves toward the air-blending portion 18. The cool air from the bypass passage 16 and the warm air passing through the heater core 15 are blended in this air-blending portion 18, whereby the air is set to a desired temperature.

There are a plurality of air outlet apertures, including a face aperture 19, a defroster aperture 20, and a foot aperture 21, which open sequentially from the rear side to the front side on an upper face (a downstream end of the airflow) of the casing 11. The face aperture 19 is for blowing out air-conditioned air from the air-blending portion 18 toward the upper body of a passenger. The defroster aperture 20 is for blowing out air-conditioned air from the air-blending portion 18 toward an interior surface of a vehicle windshield. The foot aperture 21 is for blowing out air-conditioned air from the air-blending portion 18 toward the feet of a passenger. The plurality of blower apertures 19, 20, and 21 are opened and closed by moving (reciprocating) a blower mode selection slide door 22, which is composed of a single, flexible film member, in the front-to-rear direction "b" of the vehicle.

Both of the above-mentioned air-mixing slide door 14 and the above-mentioned blower mode selection slide door 22 reciprocate along a curved path at the inner side of the casing 11, as shown in FIG. 1. Hence, they are constructed by a film member with flexibility (film member made of resin), so that they can be deformed and conform to this curved path. The specific material and the driving mechanism of the door can be the same for both of the doors 14 and 22. Therefore, the air-mixing slide door 14 will be described in detail, hereinafter.

Figure 2:
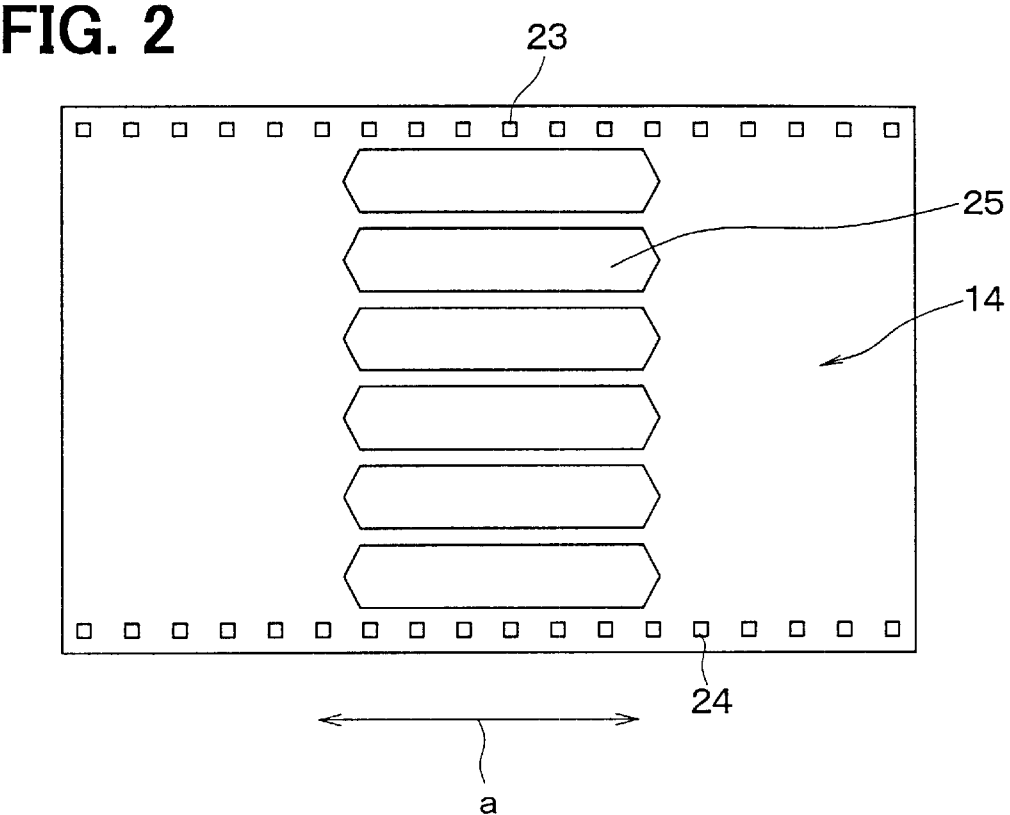
FIG. 2 is a plan view of an air-mixing slide door, used in the first embodiment.

FIG. 2 is a plan view of the air-mixing slide door 14. The slide door 14 is composed of a thin, rectangular film member made of resin. In particular, polyethylene terephthalate (PET) film is suited for the specific material of the door 14, because it is a resin material that is flexible and has a small frictional resistance.

Perforations 23 and 24 open near both end portions in a direction orthogonal to the moving direction "a" of the air-mixing slide door 14 (simply called a door width direction). The teeth 27 of a driving gear, which will be explained hereinafter, engage these perforations 23 and 24. These perforations 23 and 24 are formed at a prescribed interval in continuity for almost the whole length of the slide door 14 in the moving direction "a". There are also apertures 25, for letting the air-conditioned air pass through, divided into plural portions and opened at the central portion of the slide door 14 in the moving direction "a". On the blower mode selection slide door 22, there are also perforations (not shown) for engaging with gears similar to the perforations 23 and 24, and apertures for letting the air-conditioned air pass through (not shown) similar to the apertures 25. However, the opening location and the number of the apertures for letting the air-conditioned air pass through, in the blower mode selection slide door 22, differs from those of the air-mixing slide door 14.

As shown in FIG. 1, the driving shaft 26 of casing 11 is located at only one location in the moving direction "a" of the air-mixing slide door 14, and the air-mixing slide door 14 is made to reciprocate by the driving force transmitted from a driving gear 27 of this driving shaft 26. As a result, both end portions of the slide door 14 in the moving direction "a" are not linked to a winding mechanism, and are free ends.

With this kind of driving method, a pulling force from the driving shaft 26 acts upon the rear portion of the air-mixing slide door 14 in the moving direction "a". Moreover, a pushing force from the driving shaft 26 acts upon the front portion thereof in the moving direction "a". As a result, the slide door 14 moves.

Figure 3:
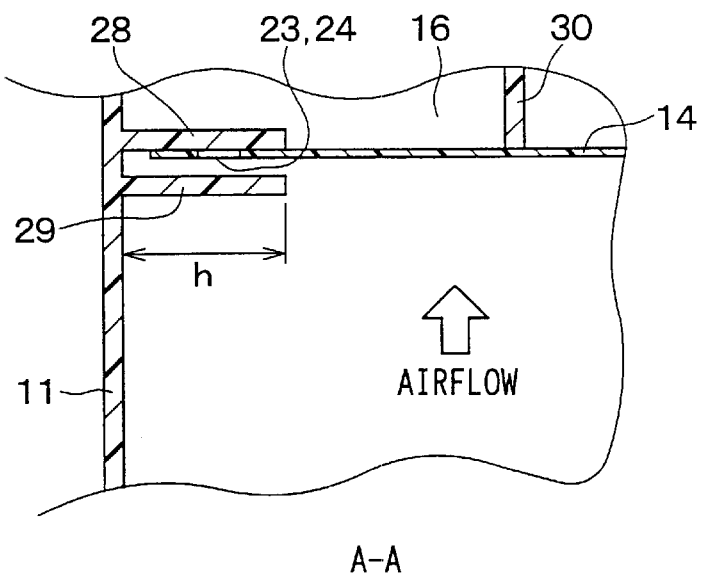
FIG. 3 is a cross-sectional view taken along line A—A in FIG. 1.

Guide members 28 and 29 are provided by being molded in unity on the inner wall face of the casing 11, as shown in FIG. 3. These guide members 28 and 29 define a groove space by protruding parallel from the inner wall face of the casing 11 with a prescribed height "h". These guide members 28 and 29 are made to guide the slide door 14 by inserting both end portions thereof into the groove space of the guide members 28 and 29.

The slide door 14 needs to have a prescribed rigidity, in order to move (advance) along the guide members 28 and 29 by the pushing force. For this reason, the material and thickness of the slide door 14 should be selected so that the necessary rigidity can be achieved. For instance, the board thickness of the slide doors 14 and 22, which are composed of film members, are made to be about 188îm, for example, and are sufficiently thin compared to the board thickness of the upper and lower casings 11a, 11b, and 11c (usually about 1 to 2 mm).

The guide members 28 and 29 are formed over the whole length of the reciprocating movement path of the slide door 14, except for the portion where the driving shaft 26 is arranged. The surrounding portion of the perforations 23 and 24 for engaging with the gear at both end portions of the slide door 14, in the width direction, is located inside the groove space of the guide members 28 and 29, and closely adheres to the surface of the guide member 28 on the downwind side. Hence, there is no wind leakage from the perforations 23 and 24. There is also a lattice member 30 provided on the downwind side of the slide door 14 by being integrally molded on the inner wall face of the casing 11. This lattice member 30 prevents a deformation of the slide door 14 due to wind pressure.

FIG. 4 is a cross-sectional view of the end portion of the driving shaft 26 in the axial direction, taken along the B—B line of FIG. 1. Both of the end portions of the driving shaft 26 in the axial direction are rotatably supported by a bearing hole 31 on the wall face of the casing 11. The driving shaft 26 is made of resin, and the driving gear 27 is molded in unity near both end portions in the axial direction of this driving shaft 26. The teeth of the driving gear 27 made in unity with the driving shaft 26 are engaged with the perforations 23 and 24 at both end portions of the slide door 14 in the width direction, and transmit an operating force (driving force) in the moving direction "a" to the slide door 14. One end portion in the axial direction of the driving shaft 26 is linked to an output axis of a driving motor (stepping motor, for example), which is not shown, outside the air-conditioning casing 11, and the driving shaft 26 is driven to rotate in the normal (forward) or reverse direction by this driving motor.

With regard to the blower mode selection slide door 22, a driving shaft 32 and a driving gear 33 are set up to reciprocate with the same mechanism as the above-mentioned air-mixing slide door 14.

The guide members 28 and 29 are enlarged to form walls having almost the same dimension as the whole dimension of the air-mixing slide door 14 in the width direction at portions to the vehicle's front direction side and the vehicle's rear direction side of the evaporator 13. With this constitution, accommodating slide spaces 34 and 35 are formed, which accommodate the whole portion of both of the end portions of the air-mixing slide door 14 in the moving direction "a". In the blower mode selection slide door 22, the guide members (not shown) are enlarged to form walls having almost the same dimension as the whole dimension of the blower mode selection slide door 22 in the width direction at portions to the vehicle's front direction side of the evaporator 13. With this constitution, an accommodating slide space 36 is formed, which accommodates the whole portion of one end portion of the blower mode selection slide door 22 in the moving direction "b".

As shown in FIG. 1, there is an aperture 15b for the air flow passage (warm air passage) 15a of the heater core 15, and an aperture 16a for the bypass passage 16, both of which are arranged on the downwind side, partially in the moving direction "a" of the air-mixing slide door 14. Hence, the air-mixing slide door 14 is made to move over both of these apertures 15b and 16a, while it is pushed by the wind pressure. There are circumferential edge-sealing portions 15c and 16b formed on the circumferential edge portions of both of these apertures 15b and 16a, onto which the air-mixing slide door 14 is attached by the wind pressure.

Similarly, since there are the face aperture 19, the defroster aperture 20, and the foot aperture 21 arranged on the downwind side, partially in the moving direction "b" of the blower mode selection slide door 22, the blower mode selection slide door 22 moves over these apertures 19 to 21, while it is pushed by the wind pressure. Thus, there are circumferential edge-sealing portions 19a, 20a, and 21a formed on the circumferential edge portions of these apertures 19 to 21, onto which the blower mode selection slide door 22 makes contact with due to wind pressure.

FIG. 5A and 5B show a principal part of this invention, and are cross-sectional views taken along the C—C and D—D lines of FIG. 1, respectively. FIG. 5A shows an example of a circumferential edge-sealing portion, by showing the cross-sectional shape of the circumferential edge-sealing portion 19a of the face aperture 19. In this example, the joining surface (split mold surface) 11d of the left upper casing 11b and the right upper casing 11c is located roughly at the central portion in the width direction of the blower mode selection slide door 22. Therefore, the joining surface 11d extends parallel to the moving direction "b" of the door. The circumferential edge-sealing portion 19a is formed in division on the left upper casing 11b and right upper casing 11c due to the existence of the joining surface 11d. The other circumferential edge-sealing portions 20a, 21a, 15c, and 16b are similarly formed in divisions on the left upper casing 11b and right upper casing 11c.

FIG. 5B shows an example of a cross-sectional shape of an aperture, by showing the cross-sectional shape of the face aperture 19. The blower mode selection slide door 22, composed of a flexible film member, deforms so that it protrudes in an expanded state to the downwind side, on receiving the airflow wind pressure. For this reason, there are lattice members 11e and 11f formed on the left and right upper casings 11b and 11c, which regulate the expanding protrusion of the slide door 22 to the downwind side.

In the example shown in FIG. 5B, these lattice members 11e and 11f are arranged at locations where they divide the dimension of the face aperture 19 in the door width direction into roughly equal intervals (divide into three equal parts). The lattice members 11e and 11f are also formed to extend the whole length of the face aperture 19 in the moving direction of the slide door 22 (perpendicular direction to the surface of the paper in FIG. 5B).

The end surfaces of the lattice members 11e and 11f on the upwind side are made to be located a prescribed distance to the downwind side of the sealing surface at the inner side of the circumferential edge-sealing portions 19a' (the sliding surface on which the slide door 22 slides) located to the left and right side in the door width direction of the face aperture 19. With this constitution, the line 11g connecting the sealing surface on the inner side of the circumferential edge-sealing portions 19a' and the end surfaces of the lattice members 11e and 11f on the upwind side in the door width direction of the face aperture 19 is made to be a curved shape in accord with the expanding and protruding shape of the slide door 22 to the downwind side.

On the other hand, the circumferential edge-sealing portions 19a shown in FIG. 5A, which are the circumferential edge-sealing portions 19a located at the rear and front side of the face aperture 19 in the moving direction of the slide door "b", has the shape of its sealing surface at the inner side forming a curved shape. Because of this, the central portion in the door width direction is dented to the downwind side more than both end portions in the door width direction. This curved shape also serves to form a draft angle α, which is needed in releasing the casings after molding when molding left upper casing 11b and right upper casing 11c with resin. In the example shown in FIG. 5A, the curved shape of the sealing surface at the inner side of the circumferential edge-sealing portion 19a is exemplified by combining inclining surfaces of straight-line form (tapered surfaces).

As can be understood from the above-mentioned illustrated shapes in FIGS. 5A and 5B, both of the following curved shapes provide a shape protruding toward the downwind side direction, and also a shape in accordance with the expanding and protruding shape of the slide door 22 to the downwind side. One of the curved shapes is the curved shape of the sealing surface in the door width direction at the inner side of the circumferential edge-sealing portion 19a located at the rear and front side of the face aperture 19 with regard to the moving direction of the door "b". The other curved shape is the curved shape of the line 11g connecting the sealing surfaces at the inner side of the circumferential edge-sealing portions 19a' located to the left and right sides of the face aperture 19 with regard to the door width direction and the end surfaces of the lattice members 11e and 11f on their upwind sides.

Both end portions, in the moving direction "b" of the door, of the upwind side end surfaces of the lattice members 11e and 11f are made continuous to the sealing surfaces at the inner side of the circumferential edge-sealing portions 19a located at the back and front side in the moving direction "b" of the door, as the continuous surface without any level difference.

The above-mentioned descriptions were made, using the face aperture 19 as an example. However, similar lattice members (lattice member 30 in FIG. 3) are also formed on apertures 15b, 16a, 20, and 21, and the sealing surfaces at the inner sides of the circumferential edge-sealing portions 15c, 16b, 20a, and 21a of these other apertures are also formed to have a similar curved shape.

An operation of an air-conditioning system for a vehicle according to the first embodiment will be described next. An apertural area defined by the aperture 25 of the slide door 14, and the aperture 15b of the air flow passage 15a of the heater core 15 and the aperture 16a of the bypass passage 16 is changed by moving the air-mixing slide door 14 in reciprocation in the front-to-rear direction "a" of the vehicle. Hence, a desired blower temperature can be achieved by mixing the cool air from the cool air bypass passage 16 and the warm air that passes through the heater core 15 in a prescribed proportion of volume of airflow.

In a maximum cooling mode, the door surface (film surface) of the air-mixing slide door 14, with no aperture, entirely closes the aperture 15b of the air flow passage 15a for the heater core 15, and the apertures 25 of the slide door 14 coincides with the aperture 16a of the bypass passage 16. This fully opens the aperture 16a of the bypass passage 16. In a maximum heating mode, the aperture 25 of the air-mixing slide door 14 coincides with the aperture 15b of the air flow passage 15a for the heater core 15 so that the aperture 15b of the air flow passage 15a is fully opened, and the door surface (film surface) of the slide door 14 with no aperture, entirely closes the aperture 16a of the bypass passage 16.

On the other hand, the face aperture 19, the defroster aperture 20, and the foot aperture 21 are switched, and opened or closed by reciprocating the blower mode selection slide door 22 in the front-to-rear direction of the vehicle. In this way, the blower mode selection slide door 22 can change ventilation into well-known blower modes; namely, a face mode, a bi-level mode, a foot mode, a foot-defroster mode, and a defroster mode.

Incidentally, both of the slide doors 14 and 22, which are composed of flexible film members, have both end portions in their moving directions "a" and "b" as free ends, and reciprocate by the driving force given by the driving shafts 26 and 32, each of which is provided at one location in the moving directions "a" and "b" of both of the slide doors 14 and 22. Thus, winding mechanisms for both of the slide doors 14 and 22 become unnecessary.

Both of the slide doors 14 and 22, composed of flexible film members, deform so that they protrude in an expanded state to the downwind side when receiving wind pressure from airflow at each of the apertures 15b, 16a, 19, 20, and 21. On the part of both of the slide doors 14 and 22 where there are no apertures 15b, 16a, 19, 20, and 21, the slide doors 14 and 22 are pressed against the sealing surface at the inner side (wall face inside the casing) of the circumferential edge-sealing portions 15c, 16b, 19a, 20a, and 21a, on the casing side, when receiving wind pressure of the airflow, and becomes a shape corresponding to the sealing surface at the inner side.

Figure 6A:
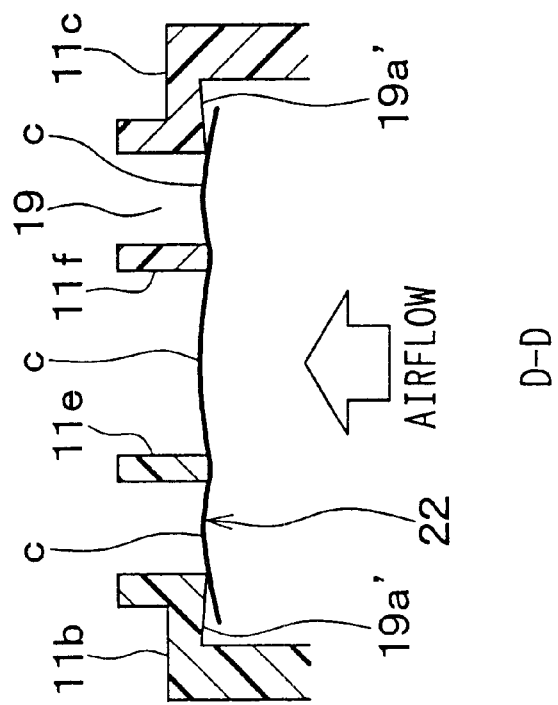
FIG. 6A is a related art cross-sectional view taken along line C—C in FIG. 1.
Figure 6B:
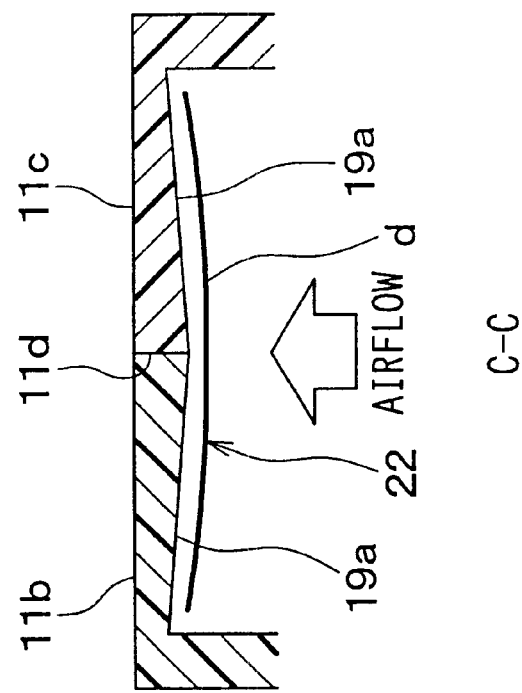
FIG. 6B is a related art cross-sectional view taken along line D—D in FIG. 1.

Therefore, as in the comparative examples shown in FIG. 6A and 6B, when the shape of the sealing surface at the inner side of the circumferential edge-sealing portion (19a and others) located at the front and back side of each of the above-mentioned apertures (19 and others) with regard to the moving directions "a" and "b" of the slide doors, is formed a reverse-curved shape, with the central portion in the door width direction made convex to the inner side, relative to both end portions in the door width direction, the following problems occur.

(1) When both of the slide doors 14 and 22 move from each of the above-mentioned apertures to the rear side, in the moving directions "a" and "b" of the doors, of each of the apertures, the following occurs. The slide doors 14 and 22 which deform so as to protrude in an expanded state (refer to the "c" portion in FIG. 6B) to the downwind side upon receiving the airflow pressure at the above-mentioned apertures are forced to be deformed into a reverse-curved shape (see the "d" portion in FIG. 6A). This is caused by the sealing surfaces at the inner side of the circumferential edge-sealing portions (19a and others) located at the rear side, in the moving directions of the doors "a" and "b", of each of the above-mentioned apertures.

(2) Conversely, when both of the slide doors 14 and 22 move from the front side, relative to the moving directions "a" and "b" of the doors, of each of the above-mentioned apertures toward each of the apertures, the following occurs. Both of the slide doors 14 and 22 which have been forced to be deformed into a reverse-curved shape by the sealing surfaces at the inner sides of the circumferential edge-sealing portions (19a and others) located at the front side with regard to the moving direction of the doors "a" and "b", are deformed so as to protrude in an expanded state to the downwind side upon receiving the airflow pressure, at each of the above-mentioned apertures.

Therefore, in either of the above-mentioned cases (1) and (2), both of the slide doors 14 and 22 deform so as to reverse its shape in the opposite direction as the above-mentioned apertures and at the circumferential edge-sealing portions at the back and front of the apertures. Hence, an abnormal sound (popping or slapping noise) accompanying this reversal action is generated.

On the other hand, in the first embodiment of the present invention, the shape of the line 11g (FIG. 5B) is made to be a curved shape denting or curving toward the downwind side, at each of the above-mentioned apertures. This line 11g connects the sealing surfaces at the inner side of the circumferential edge-sealing portions (19a' and others), located at the left and right side with regard to the door width direction, and the end surfaces of the lattice members 11e and 11f on the upwind side. On the circumferential edge-sealing portions (19a and others) located at the back and front side, with regard to the moving direction of the door of each of the above-mentioned apertures, the sealing surface at an inner side is made to be a curved shape dented more to the downwind side at the central portion with respect to the door width than at both end portions with respect to the door width. In this way, both of the curved shapes are made to dent to the downwind side.

On account of this, both of the slide doors 14 and 22 are able to maintain at all times a shape protruding in an expanded state to the downwind side at each of the above-mentioned apertures and also at the circumferential edge-sealing portions at the rear and front of the above-mentioned apertures. As a result, no reversal action in shape occurs in either of the slide doors 14 or 22. Again, this is contrary to the comparative examples shown in FIGS. 6A and 6B, which designs also cause the generation of the abnormal slapping or popping sound which accompanies the reversal action of the film member 22.

(Second embodiment)

Figure 7A:
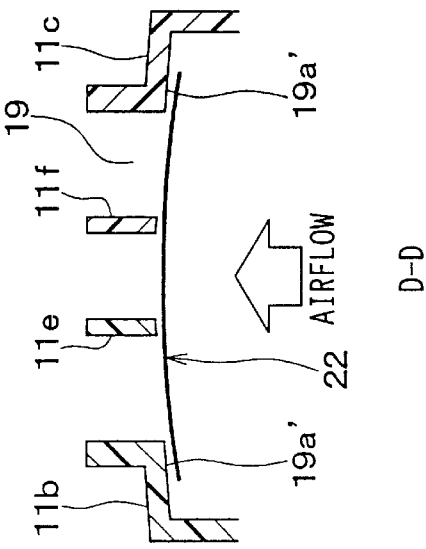
FIG. 7A corresponds to a cross-sectional view taken along line C—C in FIG. 1 according to a second embodiment.
Figure 7B:
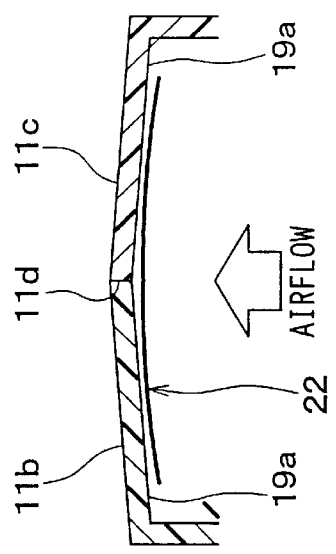
FIG. 7B corresponds to a cross-sectional view taken along line D—D in FIG. 1 according to a second embodiment.

In the first embodiment, the thickness of the left upper casing 11b and the right upper casing 11c at the circumferential edge-sealing portions (19a and others) located at the rear and front side of each of the above-mentioned apertures are made to vary so that it is made thick at both end sides in the door width direction, and made thin at the central portion in the door width direction, as shown in FIG. 5A. However, it is also possible to make the inclination of the inner side surface of the left and right divided upper casings 11b and 11c (in other words, the sealing surface on the inner side of the circumferential edge-sealing portion (19a and others)), and the inclination of the outer side surface of the casings 11b and 11c, the same. At the same time, the thickness of the left and right divided upper casings 11b and 11c may be made to be constant from both end sides in the door width direction to the central portion in the door width direction, as shown in FIGS. 7A and 7B.

(Third embodiment)

Figure 8:
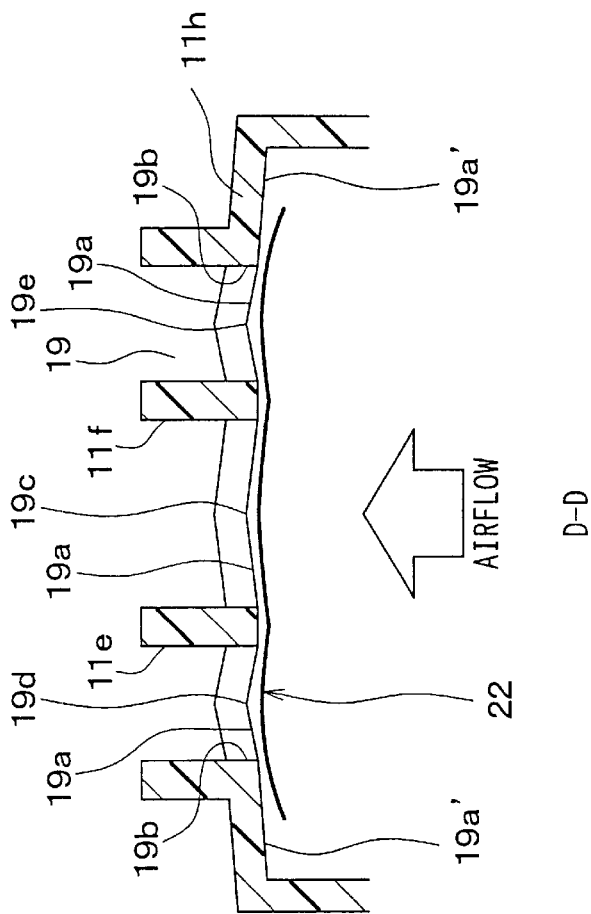
FIG. 8 corresponds to a cross-sectional view taken along line D—D in FIG. 1 according to a third embodiment.

In the first and second embodiments, it is formed so that the joining surface 11d of the left and right divided upper casings 11b and 11c is located at the central position, with respect to the width, of both of the slide doors 14 and 22. It is also formed so that the sealing surfaces on the inner sides of the circumferential edge-sealing portions (19a and others) located at the rear and front side of each of the above-mentioned apertures are mostly dented or formed downwind at the joining surface 11d portion. However, this invention can be applied to a constitution that does not have the joining surface 11d located at the central portion in the width direction, as in the third embodiment shown in FIG. 8.

In the third embodiment, the upper casings 11b and 11c of the casing 11 are not made to be divided casings, but made to be a casing 11h that is molded in unity (one piece). Therefore, the lattice members 11e and 11f, the circumferential edge-sealing portions 19a' to the left and right side of the aperture, and the circumferential edge-sealing portions 19a at the rear and front side of the aperture are integrally molded as the casing 11h.

In the third embodiment, the shape of the circumferential edge-sealing portion at the rear and front side of the aperture is made to be a different shape from those of the first and second embodiments. In other words, in the first and second embodiments, the sealing surface at the inner side of the circumferential edge-sealing portion at the rear and front side of the aperture is formed so that it is dented or formed to the downwind side at the central portion more than at both end portions in the door width direction. However, in the third embodiment, the slide doors 14 and 22 protrude in an expanded state to the downwind side by the wind pressure between the plurality of lattice members 11e and 11f, between lattice member 11e and end surface 19b, and between lattice member 11f and end surface 19b, which are at the left and right side of the aperture, respectively. With respect to the above-mentioned, the sealing surfaces on the inner sides of the circumferential edge-sealing portions (19a and others) at the rear and front side of the aperture are formed to have a shape with three curved shapes repeated in the door width direction, as will be specifically described in the following.

The sealing surface on the inner side of the circumferential edge-sealing portion (19a and others) at the rear and front side of the aperture is formed to be a curved shape, so as to have the following constitution. A portion 19c of the sealing surface along the extended direction of the central portion between the lattice members 11e and 11f, and portions 19d and 19e of the sealing surface along the central directions between the lattice members 11e and 11f and the end surfaces 19b at the left and right side of the aperture are dented or formed more to the downwind side of the aperture than the portions of the sealing surface along the extended directions of the plurality of lattice members 11e and 11f, and of the end surfaces 19b at the left and right side of the aperture.

Therefore, in the third embodiment, the curved shape is repeatedly formed three times in the door width direction, at the sealing surface on the inner side of the circumferential edge-sealing portion (19a and others) located at the rear and front side of the aperture. This repetition of three curved shapes corresponds to the expanding and protruding shape of the slide doors 14 and 22 to the downwind side at the aperture (19 and others). Hence the slide doors 14 and 22 move smoothly between the circumferential edge-sealing portion (19a and others) at the back and front side of the aperture and the aperture (19 and others) without being subjected to any reversing action of its shape. That is, the film member slide doors 14 and 22 do not "flip over" which causes a popping or cracking sound to occur. Therefore, the film member slide doors 14 and 22 are permitted to maintain a consistent shape when moving and being subjected to wind pressure during use.

In the third embodiment, the end surfaces at the upwind side of the lattice members 11e and 11f, are made to be on almost the same plane as the circumferential edge-sealing portions 19a' on the left and right side of the aperture.

(Other embodiments)

In the above-mentioned embodiments, the curved shape of the sealing surfaces on the inner side of the circumferential edge-sealing portions at the rear and front side of the aperture (19a and others) is constituted by combining inclining surfaces of a straight-line form (tapered surfaces). However, it is also possible to constitute this curved shape of the sealing surface on the inner side of the circumferential edge-sealing portion (19a and others) with a curved arc shape.

The curved shape of the sealing surfaces on the inner side of the circumferential edge-sealing portions (19a and others) at the rear and front of the aperture, which was described in the above-mentioned embodiments, need only be formed at least at the circumferential edge portion at the rear and front side of the aperture. On portions distant from the circumferential edge portion at the rear and front of the aperture, such as portions near the accommodating spaces 34, 35, and 36 in FIG. 1, for example, the inside surface of the casing can be made a simple planar shape instead of a curved shape.

The number of the lattice members 11e and 11f is not limited to two, and can be increased or decreased corresponding to the shape and size of the aperture. The lattice members 11e and 11f can also be omitted, when the shape of the aperture is a long aperture form extending along the moving directions "a" and "b" of the door, or when the opening area of the aperture is small.

The air passage is formed only by the upper and lower divided casings (divided passage members). The upper casings are 11a and 11b, and the lower casing is 11c which together constitute the casing 11 as the passage member. But the air passage can be formed by combining a frame body, which is constituted of a separate body from the upper and lower divided casings (divided passage members) 11a, 11b, and 11c, to the upper and lower divided casings (divided passage members) 11a, 11b, and 11c. In other words, the passage member in the present invention is not limited to divided casings, but includes a frame body that is a separate body from the divided casings, and is combined with the divided casings.

The present invention is not limited to the ventilation control in an air-conditioning system of vehicles, but can be applied broadly for various ventilation controlling purposes. Therefore, the description of the invention is merely exemplary in nature and, thus, variations that do not depart from the gist of the invention are intended to be within the scope of the invention. Such variations are not to be regarded as a departure from the spirit and scope of the invention.

What is claimed is:

1. A ventilation controlling apparatus, comprising:
   a passage member for forming an aperture of an air passage;
   a slide door composed of a film member, moving along an inner surface of said passage member; and
   a driving mechanism for providing a driving force to move said slide door, wherein
   said film member is flexible to enable deformation along a moving path inside said passage member,
   said aperture is opened and closed by moving said slide door inside said passage member, and
   a sealing surface on an inner side of a circumferential edge-sealing portion located at rear and front sides of said aperture in a moving direction of said slide door, is made to have a shape protruding more to a downwind side of said aperture at a central portion than at end portions of said slide door, said shape in said passage member being orthogonal to the moving direction of said slide door.

2. The ventilation controlling apparatus according to claim 1, wherein
   said passage member is constructed by joining together a plurality of divided passage members,
   a joining portion of said plurality of divided passage members is formed approximately parallel to said moving direction of said door and adjacent the central portion of said door, and
   a joining surface of said divided passage members is orthogonal to said moving direction of said door.

3. The ventilation controlling apparatus according to claim 1, wherein
   a lattice member, for regulating said slide door from protruding beyond said lattice member in a downwind direction of said aperture due to wind pressure, is arranged approximately parallel to said moving direction of said door, and
   end surface portions, in said moving direction of said door, on an upwind side of said lattice members, align with planes of said sealing surface on said inner side of said circumferential edge-sealing portion of said aperture.

4. The ventilation controlling apparatus according to claim 2, wherein
   a lattice member, for regulating said slide door from protruding beyond said lattice member in a downwind direction of said aperture due to wind pressure, is arranged approximately parallel to said moving direction of said door, and
   end surface portions, in said moving direction of said door, on an upwind side of said lattice members, align with planes of said sealing surface on said inner side of said circumferential edge-sealing portion of said aperture.

5. The ventilation controlling apparatus according to claim 4, wherein the planes of said sealing surfaces are mirror images of each other and intersect forming a v-shape.

6. A ventilation controlling apparatus, comprising:
   a passage member for forming an aperture of an air passage;
   a slide door composed of a film member for moving along an inner surface of said passage member; and
   a driving mechanism for providing a driving force to move said slide door, wherein said film member is flexible to enable deformation along a moving path inside said passage member, said aperture is opened and closed by moving said slide door inside said passage member, a lattice member, for regulating said slide door from protruding beyond said lattice member in a downwind direction due to wind pressure, is arranged approximately parallel to a moving direction of said slide door, and a sealing surface on an inner side of a circumferential edge-sealing portion, located at rear and front sides of said aperture, said sealing surface further located at a central portion between both end surfaces of said aperture, said lattice member being located further downwind of said aperture than portions of said circumferential edge-sealing portion.

7. The ventilation controlling apparatus according to claim 6, wherein a plurality of said lattice members are provided, and the sealing surface on the inner side of said circumferential edge-sealing portion is made with a portion of the sealing surface between said plurality of lattice members being formed more to the downwind side of said aperture than portions of the sealing surface bordering said passage member.

* * * * *